(12) United States Patent
Rosenberg

(10) Patent No.: US 8,799,059 B2
(45) Date of Patent: *Aug. 5, 2014

(54) SYSTEM AND METHOD FOR THE PRESENTATION OF ADVERTISEMENTS

(71) Applicant: Performance Pricing Holdings, LLC, New Providence, NJ (US)

(72) Inventor: Ari Rosenberg, New York, NY (US)

(73) Assignee: Performance Pricing Holdings, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/099,456

(22) Filed: Dec. 6, 2013

(65) Prior Publication Data

US 2014/0095299 A1    Apr. 3, 2014

Related U.S. Application Data

(63) Continuation of application No. 13/426,549, filed on Mar. 21, 2012, which is a continuation of application No. 11/832,448, filed on Aug. 1, 2007, which is a continuation of application No. 11/446,131, filed on Jun. 5, 2006, now Pat. No. 7,412,406, which is a continuation of application No. 09/846,431, filed on Apr. 30, 2001, now Pat. No. 7,089,195.

(51) Int. Cl.
*G06Q 30/00* (2012.01)
*G06Q 30/02* (2012.01)

(52) U.S. Cl.
CPC ........ *G06Q 30/0246* (2013.01); *G06Q 30/0225* (2013.01); *G06Q 30/0207* (2013.01); *G06Q 30/02* (2013.01); *G06Q 30/0253* (2013.01); *G06Q 30/0267* (2013.01); *G06Q 30/0273* (2013.01); *G06Q 30/0277* (2013.01); *G06Q 30/0249* (2013.01); *G06Q 30/00* (2013.01)
USPC .......................................................... 705/14

(58) Field of Classification Search
USPC .......................................................... 705/14
See application file for complete search history.

(56) References Cited

U.S. PATENT DOCUMENTS

| | | | | |
|---|---|---|---|---|
| 6,269,361 B1 * | 7/2001 | Davis et al. | ........................... | 1/1 |
| 6,591,248 B1 * | 7/2003 | Nakamura et al. | .......... | 705/14.52 |
| 6,654,725 B1 * | 11/2003 | Langheinrich et al. | ..... | 705/14.52 |
| 6,714,975 B1 * | 3/2004 | Aggarwal et al. | ............. | 709/224 |
| 7,617,121 B1 * | 11/2009 | DeMayo et al. | ........... | 705/14.26 |

(Continued)

FOREIGN PATENT DOCUMENTS

WO    WO 01/82178 A2 *   11/2001

OTHER PUBLICATIONS

Bob Moseley, In search of effective Internet ads, Apr. 2001, Foilio: The Magazine for Management, section on Pricing Gap.*

*Primary Examiner* — Arthur Duran
(74) *Attorney, Agent, or Firm* — Foster Pepper PLLC; Richard T. Black; P. G. Scott Born

(57) ABSTRACT

A system and method for the presentation of advertisements is present. According to one embodiment, a number of impressions of an advertisement message are presented over a computer network such as the Internet to a variety of viewer computers. Depending on the actions taken by the viewers (e.g., whether the Viewer selects the advertising message and accesses a web-link to the advertiser's web-site), bonus exposure (e.g., an additional number of impressions provided to the viewers) of the advertising message is given.

14 Claims, 5 Drawing Sheets

(56) References Cited

U.S. PATENT DOCUMENTS

| | | | |
|---|---|---|---|
| 2001/0056369 A1* | 12/2001 | Takayama et al. | 705/14 |
| 2002/0026352 A1* | 2/2002 | Murata | 705/14 |
| 2002/0099600 A1* | 7/2002 | Merriman et al. | 705/14 |
| 2002/0161644 A1* | 10/2002 | Duffield | 705/14 |
| 2003/0149937 A1* | 8/2003 | McElfresh et al. | 715/517 |
| 2005/0235030 A1* | 10/2005 | Lauckhart et al. | 709/200 |
| 2006/0184421 A1* | 8/2006 | Lipsky et al. | 705/14 |
| 2007/0136283 A1* | 6/2007 | Silverbrook et al. | 707/6 |
| 2009/0254971 A1* | 10/2009 | Herz et al. | 726/1 |
| 2010/0082439 A9* | 4/2010 | Patel et al. | 705/14.72 |

* cited by examiner

SYSTEM AND METHOD FOR THE PRESENTATION OF ADVERTISEMENTS

CROSS REFERENCE TO RELATED APPLICATIONS

This application is a continuation of and claims the benefit of the filing date of co-pending U.S. patent application Ser. No. 13/426,549, filed Mar. 21, 2012 which in turn is a continuation of and claims the benefit of the filing date of U.S. application Ser. No. 11/832,448, filed Aug. 1, 2007; which in turn is a continuation of and claims the benefit of the filing date of U.S. application Ser. No. 11/446,131, filed Jun. 5, 2006, now U.S. Pat. No. 7,412,406; which in turn is a continuation of and claims the benefit of the filing date of U.S. application Ser. No. 09/846,431, filed Apr. 30, 2001, now U.S. Pat. No. 7,089,195. The entire disclosures of each of the foregoing applications are herein incorporated by reference.

BACKGROUND OF THE INVENTION

The present invention relates to a system and method for the presentation of advertisements. More particularly, the present invention pertains to a system and method of presenting bonus exposure of an advertisement based on interest of one or more Viewers in the advertisement.

Advertising is a common way for a seller of goods and services to generate sales. In traditional media, such as television and print media, an advertisement is seen by a variety of people. Only a portion of those people, if any, will be inclined to seek out more information from the seller and fewer still will eventually purchase the goods and/or services offered for sale. In the traditional media, there is typically a limited supply of space for advertisements. For example, a half-hour television show will provide perhaps no more than eight minutes for advertisements. In the art, the amount of resources (e.g., physical space, time, etc.) available for advertising is sometimes referred to as inventory. In recent years, the Internet has provided a new and powerful medium for advertising.

The Internet is now regarded as a powerful tool for advertising and marketing services and products. The amount of money spent on Internet-based advertising has increased dramatically over its relatively short history and is expected to rise consistently in the foreseeable future. According to the Internet Advertising Bureau (IAB), over $2 billion dollars was spent on Internet-based advertising in the first quarter of the calendar year 2000 (a three-fold increase over the same period of 1999). Jupiter Communications, a New York consulting firm, has predicted that Internet or "on-line" advertising will reach $28 billion by 2005. The IAB has predicted that Internet-based advertising will grow almost 40% annually between 2000-2004. The increase in availability of Internet advertising and the number of persons who use the Internet will affect the advertising industry as a whole. As systems of accountability are developed and the amount of advertising inventory increases, vendors or publishers in all media will be faced with the problems of attracting advertisers while, at the same time, covering overhead costs.

One problem associated with current methods of selling Internet advertising is the difficulty of striking a fair and reasonable balance between fixed-fee based pricing and performance-based pricing. While providers of advertising resources ("Sellers") generally seek to decrease their financial risk by charging a fixed fee for advertising space, purchasers of advertising resources ("Buyers") seek to decrease their financial risk by basing payment on performance (i.e. the number of viewers of the advertising content ("Viewers") that perform a defined action, such as visit a store or web-site or make a purchase). Sellers have attempted to cover costs and attract Buyers by offering hybrids of the fixed-fee and performance-based pricing models, but pressures brought on by increased accountability and a surplus of inventory, have made it increasingly difficult for Sellers to secure fair and balanced pricing.

Sellers have been pressured into offering more performance-based pricing models because of the increase in the accountability of delivery systems, particularly with regard to Internet advertising. Traditionally, advertising fees are based on the number of Viewers exposed to the advertising content. That model, however, is being changed.

Recent methods of advertising have made it possible to determine not only the volume and demographic information on Viewers who see a particular advertising message, but the number of Viewers who actually respond to a particular advertising message by buying a product or registering with a merchant as a potential purchaser. An example of such a method is a billboard that lists a special phone number along with the advertising message. If a Viewer calls that phone number, then the merchant knows that the Viewer became interested in the product or service because of the billboard message. Another example is Internet-based advertising, where a set of instructions is attached to an advertising banner that redirects the Viewer to the merchant's web-page when that Viewer "clicks" on the banner. In this way, the merchant knows that the Viewer became interested in the product or service because of that message. Buyers use these methods of accountability to leverage Sellers into basing their fees on such performance.

Sellers have also been pressured into a more performance based pricing model by a surplus in inventory, particularly with regard to Internet advertising. For example, the inherent nature of the Internet creates a rapidly increasing amount of advertising inventory. Each Viewer downloads or, in effect, "creates" each presentation of the advertising message image (called an "impression") on the viewing screen. The number of impressions that may be viewed on a single screen is limited only by the amount of time the Viewer spends at the computer and the amount of time it takes to download an advertising image from the network. The number of Viewers is growing steadily as is the number of web-sites. Given these facts, and the fact that the potential inventory of advertising space on a particular web-site is limited only by the size of the site, which is also expandable, the potential supply of advertising inventory across the Internet is almost limitless. True commodity pricing assumes that a finite amount of the commodity will be available, whereas an ever-increasing supply of the commodity means that the price of that commodity will continue to decrease. Sellers are leveraged into offering a more performance-based pricing model because they cannot maintain fixed-fee-based commodity pricing.

The pressure on Sellers of Internet advertising to provide performance based pricing models is particularly intense because the Internet provides a high degree of accountability and potential inventory is almost limitless. When comparing the Internet advertising marketplace to the television or radio advertising marketplace, it is noted that the supply of television or radio commercials is dictated by the number of channels and the hours in a day. In the Internet marketplace, however, the low price of entry for new publishers and the proliferation of desktop applications and web-sites mean that the amount of advertising space will expand at a much greater rate than traditional broadcast advertising space and, thus, there are really no fixed resources to enter into the pricing structure for this type of advertising.

Currently, Sellers of Internet advertising are forced to compete with one another by offering performance based pricing and by increasing the attractiveness of their web-sites. If sites are more attractive (useful or entertaining) to the right kind of Viewer, then they will attract advertisers (Buyers of advertising) who want to reach those specific Viewers. Higher attractiveness means greater overhead costs for creating, managing, and delivering attractive content. If a Seller's revenues are based entirely on performance-based pricing models, it will run the risk of not being able to cover costs. For example, a Seller having a great reputation for attracting Viewers because of the quality of its content may run a particular Buyer's advertising campaign that, for whatever unanticipated reason, fails to attract any response from Viewers. If that Seller had based its revenue primarily on a performance-based pricing model, its revenue may be so low as to not cover overhead costs.

In view of the above, there is a need for an improved system and method for the presentation and sale of advertising in a variety of advertising media, especially in the Internet environment.

SUMMARY OF THE INVENTION

Embodiments of the present invention include methods and systems for selling advertising, which incorporates a unique pricing model wherein advertising Buyers earn bonus exposure to the advertising message based on the reflected interest by the Viewers in that advertising message. Although the method may be used with all advertising media, it is particularly well suited to Internet advertising. The methods and systems help Sellers secure fixed-fee pricing while offering a performance-based incentive to Buyers. In addition, these methods and systems can attract potential Buyers, but help maintain customer loyalty, encourage effective creative advertising design and placement, and assist Sellers in management of unsold inventory.

DETAILED DESCRIPTION

Figure 1:
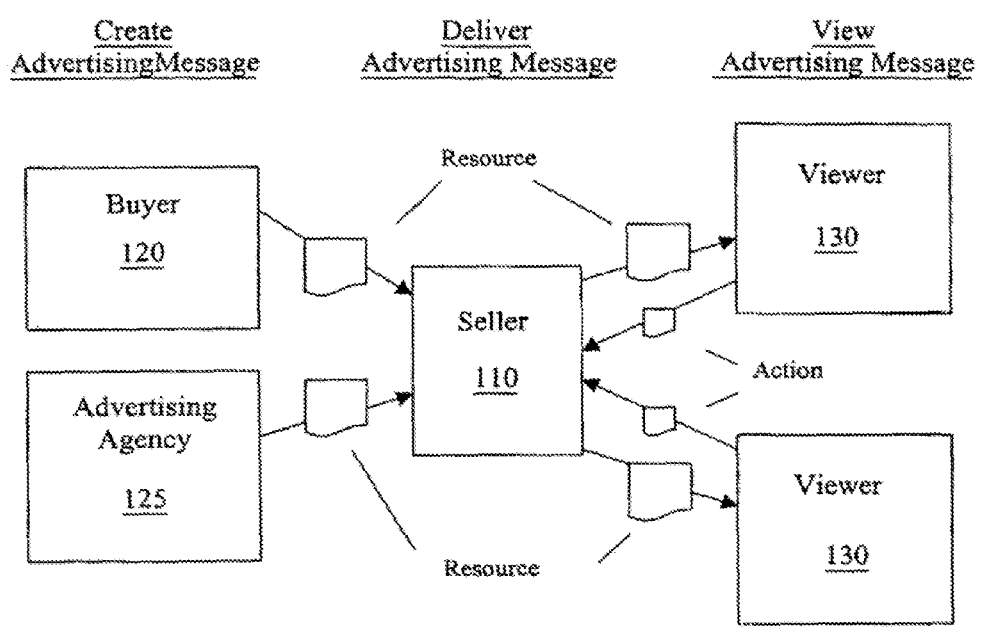
FIG. 1 is a block diagram showing the interaction of parties involved in a method and system for advertising according to an embodiment of the present invention.

In a first embodiment of the present invention, a computer network environment such as the Internet will be described. The present invention can be applied outside of a computer network environment and should not be considered limited to such an environment.

To more fully understand embodiments of the system and method of the present invention, a brief review of fixed-fee pricing and performance-based pricing for advertisements is presented below.

A fixed-fee pricing of Internet advertising is usually based on Cost Per Thousand (CPM; where "M" is the roman numeral for 1,000) of advertising message impressions delivered to the Viewers. For example a Buyer spending $20,000 on a certain advertising campaign might negotiate a CPM of $10 and receive 2,000,000 advertisement impressions delivered to the Viewers.

Performance-based pricing of Internet advertising is usually based on Cost Per Action (CPA) where the Seller receives payment when the Viewer performs a particular "action" in response to the advertising message. Such "actions" may include the following:

Cost per Click: The Buyer pays a fixed fee to the Seller every time a reader "clicks" (selects a link such as a hypertext link associated with the advertising message with a cursor movement device or the like) on the physical advertising unit displaying the advertising message, which results in a Viewer being redirected to a site determined by the Buyer (such as the Buyer's electronic-commerce or Internet site) associated with the link. The viewer's computer would then display content from the site(s) associated with the link.

Cost Per Customer: The Buyer pays a fixed fee to the Seller every time a Viewer who is viewing an advertising message on a Seller's site clicks on that advertising message, is redirected to the Buyer's site, and completes a purchase transaction on the Buyer's site.

Cost Per Name: The Buyer pays a fixed fee to the Seller every time the Seller collects relevant viewer information (such as a name or electronic mail (e-mail) address) of a Viewer who is viewing the Seller's site and gives the Seller permission to transfer this information to the Buyer or Buyer's computer system.

Assuming that the Buyer has the same budget of $20,000 for a certain advertising campaign, it may negotiate a CPA of $1.00 with the Seller that includes as many impressions that will be downloaded to Viewers to obtain 20,000 actions. Typically, the Buyer and Seller will pay attention to the rate of actions per impressions delivered to determine whether or not the advertising campaign is effective. If the rate is lower than anticipated by either party, the campaign is likely to be changed either by changing the content or placement of the message or by canceling the campaign itself (either by the Buyer or the Seller). It is usually the Buyer that will cancel a campaign and use a different Seller if the rate of return is less than expected. This leaves the Seller with the additional problem of maintaining Buyer loyalty in the campaign. Currently, 48% of all Internet advertising purchases are based on the CPM pricing model, while only 10% of the purchases are based on the CPA pricing model. The remaining 42% of the purchases are based on a hybrid of the CPM and CPA models, wherein the Buyer pays a significantly lower CPM rate than what would normally be charged by the Seller under the CPM pricing model, as well as an additional fixed fee for every action taken by a Viewer in response to the advertising message.

As there is an increasing number of Sellers entering the market and competing for Buyers, there is an increasing pressure on Sellers to attract Buyers with CPA (performance-based) deals. As discussed above, however, it may be too risky for Sellers to create and manage content on a budget that relies strictly on CPA. Sellers must base a certain amount of the advertising purchase on CPM (or other fixed-fee pricing models) to insure that, regardless of the appeal of a certain advertiser's message, they will have enough revenue to create and manage site content.

As discussed below, improved methods and apparatus are described for the presentation and sale of advertisements in a computer network system or other environments. Embodiments of the present invention may be implemented using general purpose processors or special purpose processors operating under program control, or other circuits, adapted to particular process steps and data structures described herein.

The following terms refer or relate to aspects of the present invention as described below. The descriptions of general meanings of these terms are intended to be illustrative instead of limiting.

Exposure—the display of the message in the media. In terms of Internet advertising, exposure may be measured in units, called "impressions", which is typically, but not limited to, a single image or message file downloaded to a Viewer's computer. Exposure could also be the presentation of an image in print media, television media, etc. Exposure may be based on units of time, size of the message, or any other factors that affect display of the message in the chosen media.

Bonus Exposure—additional exposure provided (e.g., for an advertising message). In terms of Internet advertising, bonus exposure may be expressed as an additional number of impressions for a given advertising message.

Action—an action of the Viewer that expresses interest in the advertising message.

Cost Per Action (CPA)—a pricing model based on a price per action taken by the Viewer in response to an advertising message.

Cost Per Thousand (CPM)—a pricing model (e.g., in an Internet environment) where the price is based on the thousands of impressions downloaded to Viewers.

According to a first embodiment of the present invention, a system and method are presented that rewards an advertising Buyer with bonus exposure of one or more advertisement messages. In one embodiment, the bonus exposure is awarded based on Viewer action (e.g., a viewer expressing interest in the Buyer's advertising message as described above). The first embodiment of the present invention is presented in connection with a computer network system environment.

Referring to FIG. 1, a block diagram showing the interrelationship between a Buyer, a Seller, and Viewers over a network system is shown. A Seller 110 may provide impressions on a web-site or other location that can be accessed by other computers over the Internet. In some cases, the Sellers actually provide the network location for storage of the media or may act simply as a Broker between a Buyer 120 and a third party that will present the advertisements.

The Seller 110, for example, enters into an agreement with the Buyer 120 to publish the Buyer's 120 advertising message. For example, in the case of Internet advertising, the Seller 110 may agree to post the Buyers' 120 advertising messages on a web page that is part of a web-site. The exposure of the advertising message is usually measured in units of time or numbers of advertising messages delivered to Viewers. In the case of Internet advertising, exposure may be measured as the number of impressions of the advertising message downloaded to Viewers 130.

The Buyer 120 may employ an Advertising Agency 125 to create the advertising messages and negotiate agreements with the Seller 110. But, the Buyer 120 may act as its own Advertising Agency 125. When the Buyer 120 employs an Advertising Agency 125, it authorizes the Advertising Agency 125 to create the advertising messages (or advertising campaigns) and transfer those messages to Sellers 110 for publication.

A Viewer 130 is one of a set of persons who view or receive the published advertising messages. In the case of Internet advertising, the Viewer 130 is one of a set of persons who view web-sites or otherwise receive downloaded content from publishers by way of the Internet network and a browser (e.g., Netscape Communicator or Internet Explorer) exposed to the advertising message. Actions taken by the Viewers are reported back to the Seller 110 in this embodiment. Though referred to herein as individuals, the Buyer 120, Advertising Agency 125, Seller 110, and Viewers 130 may by individual or groups of computer devices coupled to the Internet or other computer network.

According to an embodiment of the present invention, a method for pricing advertising is described herein. In this embodiment, the method can be referred to as the "IPC (Impressions per Click) pricing model when applied to a communications network or Internet environment. In this embodiment, the Buyer 120 pays a predetermined fee to the Seller 110 for a predetermined amount of exposure of the Buyer's advertising message. The Seller 110 agrees to award the Buyer 120 with bonus exposure for the advertising message based the amount of interest in the advertising message expressed by at least one Viewer 130.

In this embodiment, the amount of bonus exposure awarded to the Buyer 120 is based on a predetermined formula or set of rules that is negotiated as part of the agreement between the Buyer 120 and the Seller 110. Bonus exposure can be based on a threshold of interest expressed by at least one Viewer 130, or a ratio of interest expressed in response to the amount of exposure provided. The interest can be measured in actions performed by the Viewer 130 in response to viewing the advertising message. The method of calculating bonus exposure may be different depending on whether actions are counted in response to the predetermined exposure or in response to the bonus exposure.

In the case of Internet advertising, for example, the Seller 110 may agree to present a predetermined amount of exposure (e.g., the display of a certain number of image impressions, the playing of a certain number of audio files, etc.) of the Buyer's 120 advertising message to a set of Viewers 130. A Viewer 130 views the Seller's 110 web page (or other downloadable content) containing the Buyer's 120 advertising message. In this example, the Seller 110 awards the Buyer 120 by presenting bonus exposure (such as a certain number of image impressions) of the advertising message based on the number of Viewer 130 actions (such as "click throughs") made in response to this exposure of the advertising message.

Figure 2:
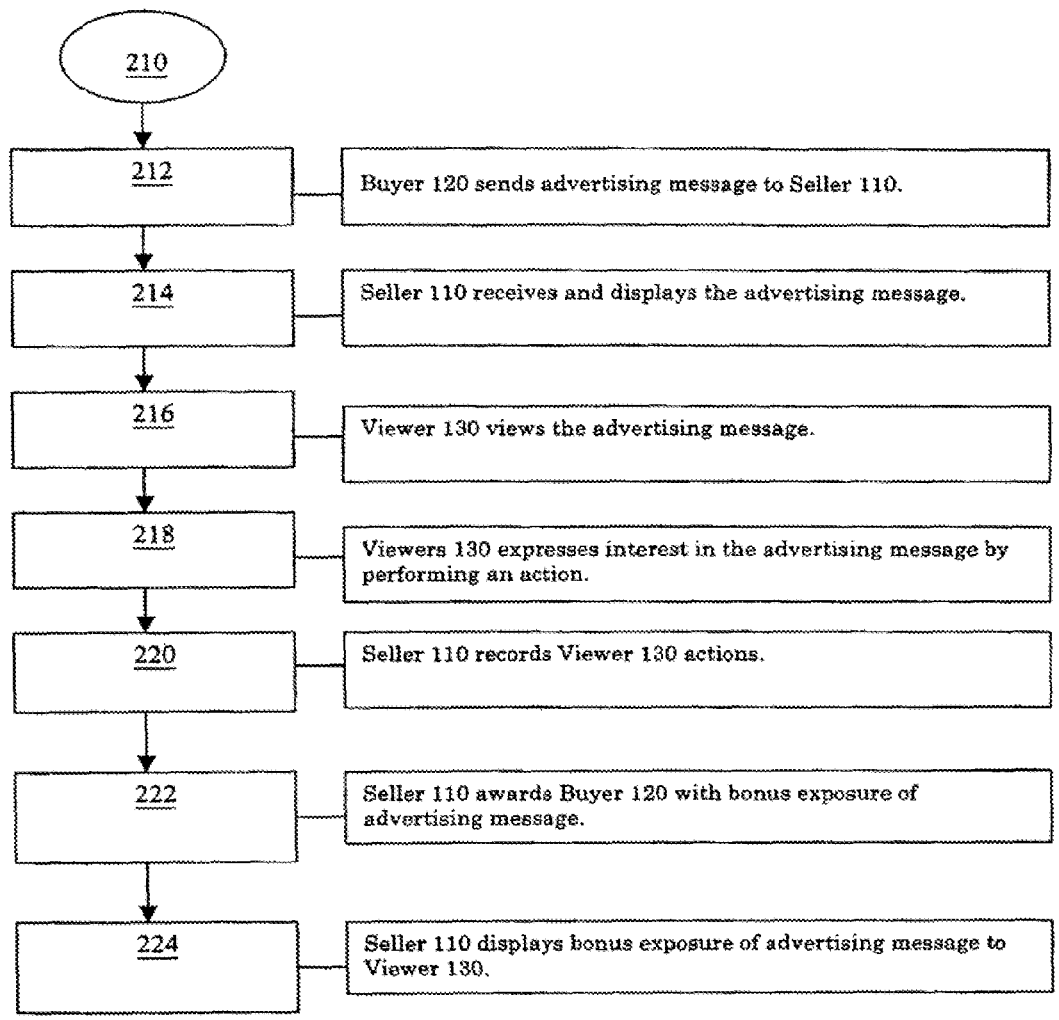
FIG. 2 is a flow diagram for a method of selling advertising according to an embodiment of the present invention.

Referring to FIG. 2 shows a flow diagram for a method of selling advertising is shown according to an embodiment of the present invention. At block 210, the Seller 110 has secured an agreement with the Buyer 120 (or its Advertising Agency 125 acting on the Buyer's 120 behalf) to publish the Buyer's advertising message. The agreement is based on an example of the IPC pricing model previously described In block 212, the Buyer 120 sends (or authorizes its Advertising Agency 125 to send) an advertising message to the Seller 110. Then, in block 214, the Seller 110 receives the advertising message from the Buyer 120 or the Advertising Agency 125 and causes the advertising message to be published. For example, in the case of Internet advertising, an image of the advertising message can be displayed within a web page along with other downloadable content.

In block 216, Viewers (e.g., Viewer 130 in FIG. 1) are exposed to the advertising message. As described previously, the exposure of the advertising message is based on the parameters of the media in which it is presented. For example, if the advertising message is presented on the Internet, for example, the advertising message can be presented as a banner advertisement, an audio file, etc.

In block 218, Viewers express interest in the advertising message by performing some actions recordable by the Seller 110. For example, in the case of Internet advertising, the Viewer 130 can "click" on a banner advertising message, causing the browser to be redirected to a website determined by the Buyer 120 and associated with the banner advertising message. A Viewer's 130 "click" can be counted as an action made by Viewer 130 in response to the advertising message. Other examples of Viewer actions in the Internet environment are described above.

In block 220, the Seller 110 records the number of actions made by the Viewers in response to the predetermined exposure of the advertising message. For example, in the case of Internet advertising, the Seller 110 can record the number of actions (such as "click through") made by the Viewers in response to the predetermined number of impressions presented by the Seller 110 to the Viewers. In one embodiment of the method, only actions made in response to the predetermined exposure of the advertising message are counted. Alternatively, actions made in response to both the predetermined exposure and the bonus exposure (described in further detail below) of the advertising message may be counted.

In block 222, the Seller 110 rewards the Buyer 120 by authorizing additional exposure of the advertising message to the Viewers based on the agreement (incorporating the IPC pricing model) between the Seller 110 and the Buyer 120. For example, in the case of Internet advertising, the Seller 110 may reward the Buyer 120 by providing advertising resources to allow for the downloading of 1000 bonus impressions for every one action made by the Viewers in response to the presentation of the predetermined number of impressions of the advertising messages.

Seller 110 and Buyer 120 may agree that bonus exposure will only be awarded based on the number of actions received in response to the predetermined exposure of the advertising message. Alternatively, as stated above, Seller 110 and Buyer 120 may agree that bonus exposure may also be awarded based on actions received in response to both the predetermined exposure and the bonus exposure of the advertising message. Different thresholds or ratios may be used to determine the amount of bonus exposure awarded depending on whether actions are received in response to the predetermined exposure or bonus exposure. For example, in the case of Internet advertising, Seller 110 and Buyer 120 may agree that 1000 bonus impressions will be awarded for every action received in response to the predetermined number of impressions downloaded to Viewers 130 and only 100 additional bonus impressions will be awarded for every action received in response to bonus impressions downloaded to Viewers 130. In such a case where bonus exposure is awarded for actions received in response to predetermined exposure and bonus exposure, the parties may agree to some limit in the total amount of exposure to be awarded (to prevent the campaign from going on indefinitely).

In block 224, the Seller 110 provides bonus exposure of the advertising message to the Viewers. In the case of Internet advertising, the Seller 110 may display bonus impressions of the advertising message to the Viewers 130.

Figure 3:
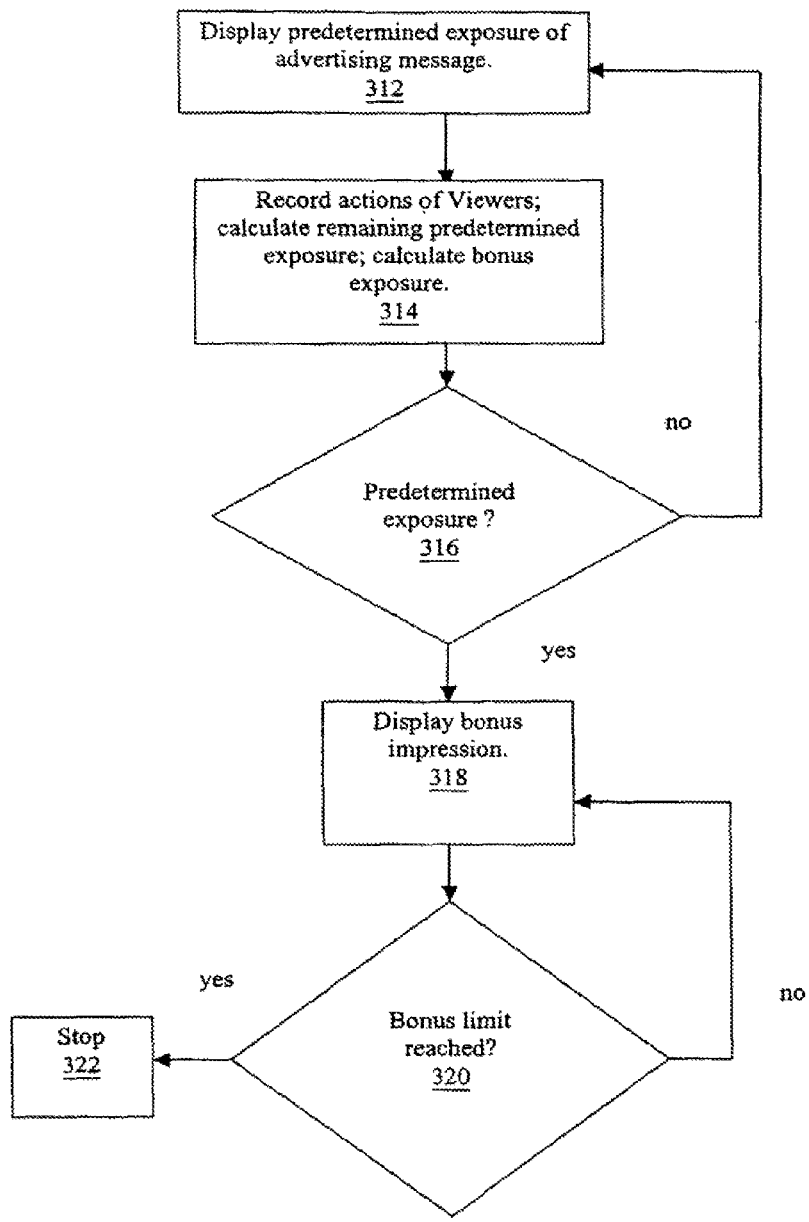
FIG. 3 is a decision tree diagram illustrating an example of the process of presenting exposure of an advertising message based.

Referring to FIG. 3 a decision tree diagram illustrating an example of the process of presenting exposure of an advertising message based on a method of the present invention is shown. Prior to block 320, there is an agreement between the Buyer 120 and the Seller 110 where the Buyer 120 will pay a predetermined fee for a predetermined exposure of the advertising message (e.g., CPM) and the Buyer 120 will receive bonus exposure of the advertising message based on the number of actions received from the set of Viewers in response to the predetermined exposure of the advertising message.

At block 312, the Seller 110 provides the predetermined exposure of the advertising message to the Viewers. In block 314, the Seller 110 records the interest of the Viewers made in response to the predetermined exposure of the advertising message (e.g., through the monitoring of Viewer actions taken with respect to the advertising message). The Seller 110 calculates the amount of predetermined exposure remaining and any earned bonus exposure based on the recorded interest of the set of Viewers in the predetermined exposure of the advertising message.

In decision block 316, it is determined whether there is any predetermined exposure remaining. If predetermined exposure is remaining, the process returns to block 312 and the Seller 110 continues to provide predetermined exposure of the advertising message to the Viewers. If there is no predetermined exposure remaining, the process proceeds to block 318.

At block 318, the Seller 110 provides any earned bonus exposure of the advertising message to the set of Viewers and calculates the amount of bonus exposure remaining. In decision block 320, it is determined whether there is any bonus exposure remaining. If bonus exposure is remaining, the process returns to block 318. If no bonus exposure is remaining, the process proceeds to block 322 where the Seller 110 discontinues presentation of the bonus exposure.

The method described in FIG. 3 is only one example of a decision tree for authorizing and awarding bonus exposure, and other decision tree schemes may apply depending on the nature of the agreement between Seller 110 and Buyer 120 in terms of how bonus exposure will be awarded.

Figure 4:
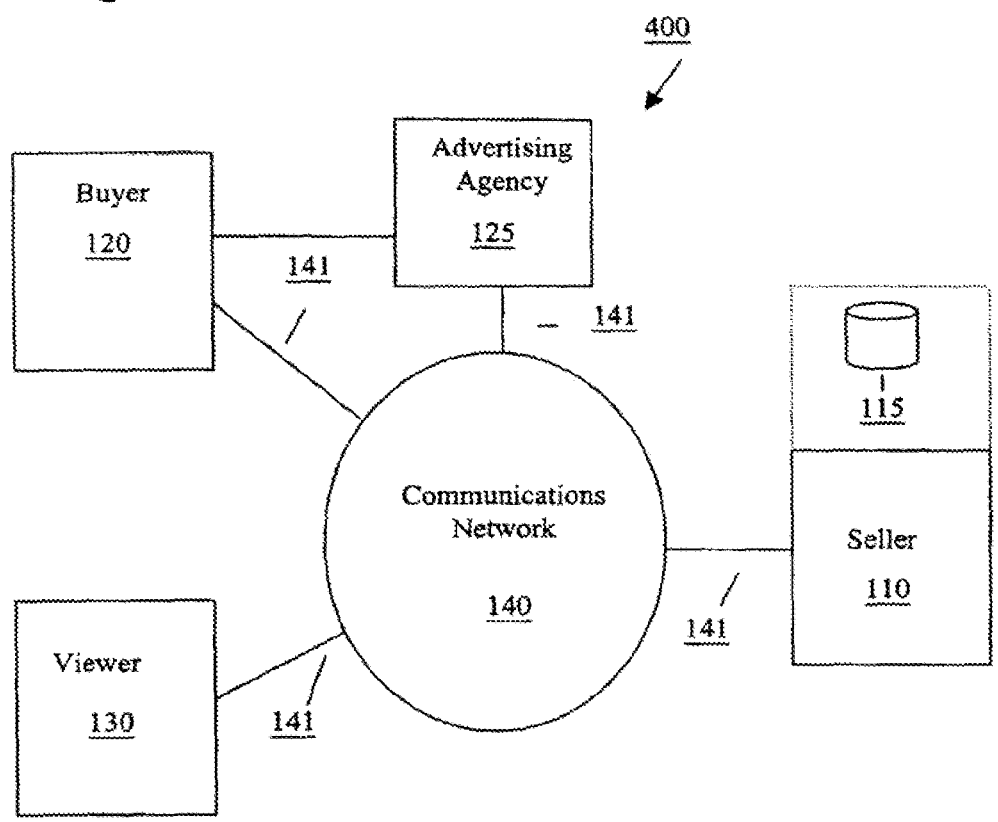
FIG. 4 shows a block diagram of a system for implementing the business method using a communications network.

Referring to FIG. 4 a block diagram of a communications network that can be used to implement an embodiment of the present invention is shown. In this example, the system 400 includes a Seller 110, a Buyer 120, a statistical database 115 (such as a file server), a set of Viewers (e.g., Viewer 130), and a communications network 140. On skilled in the art will appreciate that each of the components of FIG. 4 may include one or more computers and/or servers that include processors or the like to execute a set of instructions to implement the methods described herein.

A server controlled by the Seller 110 may be a Web server that includes a processor, program and data memory, mass storage, and a communication link 141 (to connect to communications network 140). The processor, program and data memory, and mass storage operate in conjunction to perform the functions of a display device (such as a web "site"). The server controlled by the Seller 110 responds to the set of Viewers using a network protocol (such as Hypertext Transfer Protocol or HTTP).

The server controlled by the Seller 110 receives and maintains statistics related to advertising messages downloaded to the set of Viewers as well as actions (such as "clickthroughs") received from the Viewers. Such statistics are maintained as an internal or external statistics database (e.g., stored at a data server 115) that is in communication with the server controlled by the Seller 110 and the Buyer 120. Interested parties (such as Seller's 110 or Buyer's 120 administrators) can access and examine the statistics database 115 via communications network 140.

A computer controlled by the Buyer 120 (and/or a computer controlled by the Buyer's 120 Advertising Agency 125) may include a processor, program and data memory, and mass storage which operate in conjunction to perform the functions of a Web server. The Buyer's 120 computer and/or Advertising Agency's 125 computer communicates with the server controlled by the seller and coupled with the statistical database server 115 using a communications protocol (such as HTTP). The contract between the Buyer 120 and the Advertising Agency 125 to create the advertising messages to be published by the Seller 110 is optional in this embodiment of the present invention. In such a case where the Buyer 120 creates its own advertising messages (or advertising campaign), the Buyer 120 would be acting as its own Advertising Agency 125.

In this embodiment, each Viewer 130 has access to a computer containing a processor, program and data memory, and mass storage. The processor, program and data memory and mass storage operate in conjunction to perform the functions of a Viewer 130 (e.g., as a Web "browser"). Each computer utilizes a communications protocol (such as HTTP) in this embodiment to request and receive network objects from the server controlled by the Seller 110. The requests and responses are routed using the communication network 140.

In one embodiment, the communications network 140 may include the Internet, an intranet, extranet, virtual private network, enterprise network, or another form of communication network or a combination of these systems. In a preferred embodiment, the communications network 140 includes a network capable of routing messages between and among one or more servers controlled by any set of Sellers, any set of Buyers (and/or any set of Advertising Agencies), and of the Viewers. However, there is no particular requirement that the communication network 140 must comprise an actual network, so long as the communication network 140 includes at least some technique for communication between any one Viewer 130 and any one Seller 110.

The communication links 141 operate to couple the server controlled by the Seller 110, the computer controlled by the Buyer 120 (and/or the Buyer's Advertising Agency 125), and the computer accessed by the Viewer 130 to the communications network 140.

In one embodiment, the Seller 110 contracts with the Buyer 120 to provide a predetermined amount of exposure of the Buyer's advertising message to Viewers 130. This agreement incorporates the IPC pricing model described previously. The parameters of the predetermined exposure and the bonus exposure are stored on the statistics server 115, which may be readily accessed by the Seller 110.

One of the Viewers requests the download of a web page from the Seller 110 via the communications network 140. These requests are received by the Seller 110 using the server, which downloads a web page to the browser accessed by the requesting Viewer 130. The downloaded web page includes a number of content elements, including instructions for the Viewer 130 to request the download of an advertising message to be included as part of the web page or in addition to the web page (such as in a separate window or audio file).

In addition to downloading the web page, the server controlled by the Seller 110 may access the statistical database 115 which records the Viewer's 130 request and obtain statistical information about the parameters of predetermined exposure and bonus exposure negotiated as part of the agreement between Seller 110 and Buyer 120 as well as the number of actions taken by the Viewers in response to the downloaded advertising message. Using the information recorded in the statistical database 115, the server controlled by the Seller 110 determines whether to authorize the download of the requested advertising message.

The Viewer 130, in response to receiving the downloaded web page from the Seller 110 and the instructions to request download of an advertising message to be included within that web page, requests the download of the display of the advertising message to be included with the display of the web page. If the server controlled by the Seller 110 has determined that additional exposure of the advertising message is authorized, the server controlled by the Seller 110 provides further exposure of the advertising message to the Viewer 130 and utilizes the statistical database 115 to record that it received and honored the request from the Viewer 130. The computer accessed by the Viewer 130 receives the authorized exposure of the advertising message from the Seller 110 and displays that advertising message with the downloaded web page.

If the Viewer 130 is interested in the advertising message and performs an action, such as a "click-through", instructions associated with the advertising impression cause the browser accessed by the Viewer 130 browser to be redirected to a web-site determined by the Buyer 120 (usually the Buyer's 120 e-commerce web-site). The Viewer's 130 action can then be recorded in the statistical database 115.

If, at such time that the Viewer 130 requests the exposure of the advertising message from the Seller 110, and the server controlled by the Seller 110 determines, by accessing the statistical database 115 and calculating the authorized exposure of the advertising message under the parameters of the agreement between the Seller 110 and the Buyer 120, that further display of the advertising message cannot be authorized, then the Seller 110 may utilize its server to download for exposure an advertising message from a different Buyer 110 or exposure of an internal advertising message, which will then be displayed to the Viewer 130 along with the downloaded web page.

Figure 5:
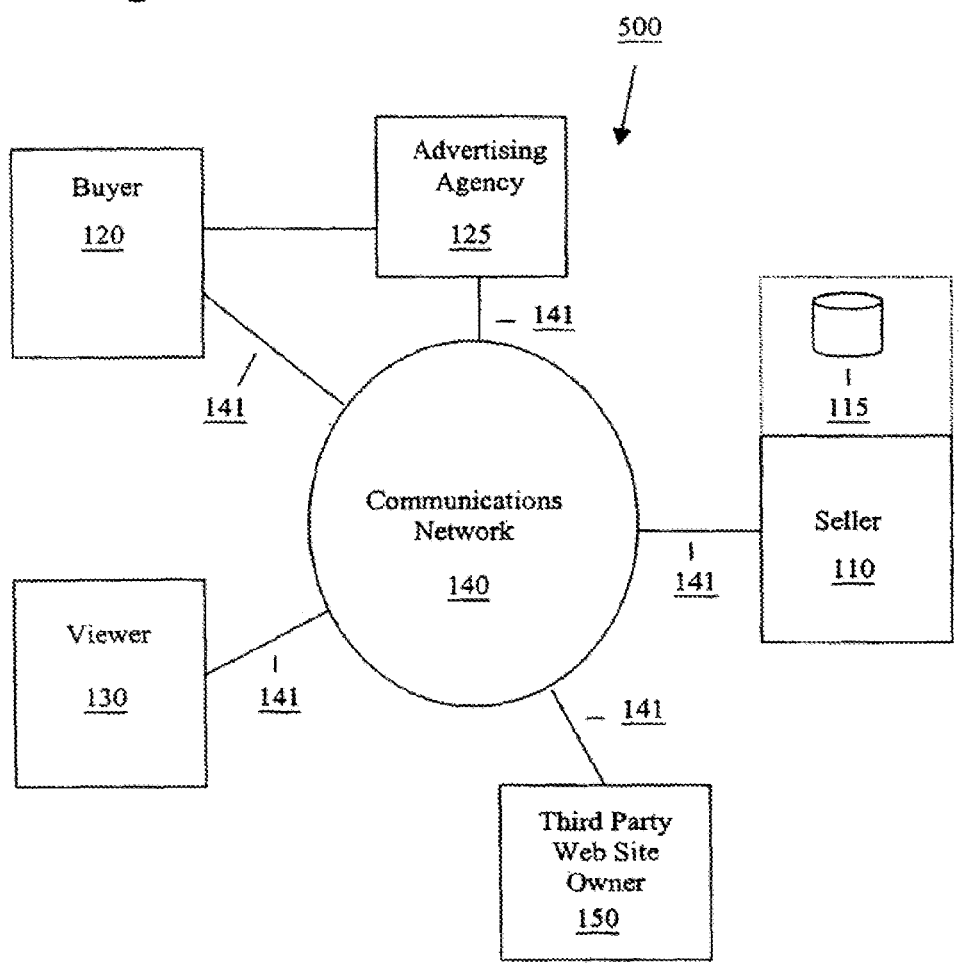
FIG. 5 shows a block diagram of an alternative system for implementing the business method using a communications network.

Referring to FIG. 5, an alternative embodiment of the present invention is shown. The system of FIG. 5 is similar to that of FIG. 4, except that the Seller 110 is not a publisher, but acts as a broker between the Buyer 120, the Viewer 130 and a Third Party Web Site Owner 150. In this embodiment, a Viewer's 130 request for download of exposure of the advertising messages is received by the Third Party Web Site Owner 150 and relayed to the Seller 110 where a determination is made, along the procedure set forth in the description of the preferred embodiment above, whether exposure of the advertising message may be authorized. If exposure of the advertising message is authorized, the server controlled by the Seller 110 downloads the advertising message to a server controlled by the Third Party Web Site Owner 150 for delivery to the Viewer 130. Any action made by the Viewer 130 in response to the downloaded advertising message can be relayed between the server controlled by the Seller 110 and the server controlled by the Third Party Web Site Owner 150. In yet another alternative, the Third Party Web Site owner has already stored the advertising message in its server database, and is simply waiting for authorization of the download of the advertising message to the Viewer 130.

From the foregoing, it will be appreciated that embodiments of the present invention may result in several advantages for Viewer, Buyers, and Sellers. For Viewers, more of the advertising messages presented will be relevant and compelling because bonus exposure resulted from Viewer actions concerning these messages. For the Buyer, performance-based price incentives are provided. For example, the method and system described above provides a potentially lower fixed price per impression. An example of an advertising campaign incorporating the method and system previously described is provided below: If a Buyer running an Internet advertising campaign commits $50,000 to the predetermined exposure of its advertising message and negotiates the predetermined exposure (in Cost Per Thousand Impressions) at $10, the Buyer's predetermined exposure will be 5,000,000 impressions. Assuming that the negotiated IPC is 1,000 bonus impressions awarded for each action received in response to the predetermined exposure and using hypothetical action rates, the effective cost per thousand impressions delivered may be as follows.

| Action % | # of Actions | Bonus Imp. | Total Imp. | Effective CPM |
|---|---|---|---|---|
| 0.1 | 5,000 | 5,000,000 | 10,000,000 | $5.00 |
| 0.2 | 10,000 | 10,000,000 | 15,000,000 | $3.33 |
| 0.3 | 15,000 | 15,000,000 | 20,000,000 | $2.50 |
| 0.4 | 20,000 | 20,000,000 | 25,000,000 | $2.00 |

In other words, the performance of the campaign (as expressed by interest elicited from the Viewer) extends the exposure of that campaign which effectively decreases the effective predetermined cost for that exposure.

For the Seller, a fixed-price model is presented that can guarantee revenue. The system can also encourage Buyer loyalty because Buyers are encouraged to maintain loyalty to Sellers not only because they earn bonus impressions, but also because the award of bonus impressions may be conditional on completion of the contract. The present system can also provide a preferable way to balance use of excess inventory. For example, Sellers of Internet-based advertising often use excess inventory for internal advertising. While such in-house advertising may increase Viewers interest in the Seller's site, too much in-house advertising may deter Buyers from advertising with the Seller because they perceive that Seller site has no market demand. Also, the present invention may provide a preferable way to encourage proper creativity and placement of the advertising message. Buyers may be encouraged to not only design advertising messages that encourage Viewer interest in the site, but to compete for positioning of the message, which may have the effect of increasing the fixed price of exposure.

Although embodiments are specifically illustrated and described herein, it is to be appreciated that modifications and variations of the present invention are covered by the above teachings and are within the purview of the appended claims, without departing from the spirit and intended scope of the invention.

The present invention can be extended to other advertising and media environments outside of the Internet or other communication network. For example, the present invention can have application in billboard advertising, television and radio advertising, and advertising in print media.

In the case of billboard advertising, the Seller may agree to display the Buyer's advertising message on a billboard for a predetermined period of time. If, for example, the billboard includes a special telephone number, the Seller can reward the Buyer with bonus exposure of the advertising message by displaying the advertising message for a longer period of time based on the number of telephone calls received from the Viewers in direct response to seeing the advertising message displayed on the billboard. The bonus exposure can be based on calls received during the predetermined period of time or during both the predetermined period of time and the bonus exposure (depending on the agreement between Buyer and Seller).

In the case of broadcast advertising, the Seller may agree to broadcast Buyer's 120 advertising message (again, including a telephone number to dial for more information, for example) a predetermined number of times. The Seller may reward the Buyer 120 with a bonus exposure by broadcasting the advertising message an additional number of times based on the number of telephone purchases received by the set of Viewers in direct response to a Viewer's response to one or more of the predetermined number of broadcasts of the advertising message.

In the case of print media, an image of the advertising message can be displayed in a printed publication. The Viewer can call the Seller in response to seeing the advertising message and that telephone call would be counted as an action. To assure that the action was made in direct response to the advertising message, the Viewer 130 can be asked for a unique identifier that is displayed as part of the particular advertising message.

As with the Internet and communications examples described above, the amount of exposure and the amount of interest (measured, for example, by the number of actions taken by the Viewer) can be recorded so as to control the appropriate amount of exposure (including bonus exposure) provided for the advertising messages.

What is claimed is:

1. A system for the presentation of at least one advertisement message to viewers of at least one website, the system comprising:
    at least one processor; and
    at least one storage device in communication with the at least one processor, the at least one storage device including instructions that, when executed by the at least one processor, enable the performance of a method comprising the steps of:
        ascertaining with the at least one processor a predetermined cost to an entity per impression of an advertising message;
        presenting, with the at least one processor, the advertising message for display on a website such that the advertising message is viewable via one or more viewer computers;
        detecting with the at least one processor a quantity of actions performed by users of the one or more viewer computers; and
        as the quantity of the detected actions increases, then with the at least one processor decreasing the cost per impression of the advertising message to the entity below the predetermined cost.

2. The system of claim 1, wherein the actions comprise selections of the advertising message.

3. The system of claim 1, wherein the actions comprise click-throughs.

4. The system of claim 1, wherein the entity comprises one of an advertiser and a buyer of the advertising space.

5. The system of claim 1, wherein the entity provides at least one of a good and a service, the at least one of a good and a service being a subject of the advertising message.

6. A system for the presentation of at least one advertisement message to viewers of at least one website, the system comprising:
    at least one processor; and
    at least one storage device in communication with the at least one processor, the at least one storage device including instructions that, when executed by the at least one processor, enable the performance of a method comprising the steps of:
        ascertaining with the at least one processor a predetermined cost to an entity of an advertising campaign;
        presenting, with the at least one processor, at least one message associated with the advertising campaign for display on a website such that the advertising message is viewable via one or more viewer computers;

detecting with the at least one processor a quantity of actions performed by users of the one or more viewer computers; and as the quantity of the detected actions increases, then with the at least one processor lowering the cost to the entity of the advertising campaign below the predetermined cost.

7. The system of claim 6, wherein the actions comprise selections of the advertising message.

8. The system of claim 6, wherein the actions comprise click-throughs.

9. The system of claim 6, wherein the entity comprises one of an advertiser and a buyer of advertising space on which the message is displayed.

10. The system of claim 6, wherein the entity provides at least one of a good and a service, the at least one of a good and a service being a subject of the advertising message.

11. The system of claim 6 wherein the cost to the entity of the advertising campaign comprises cost per action.

12. The system of claim 6 wherein the cost to the entity of the advertising campaign comprises CPM.

13. The system of claim 6 wherein the cost to the entity of the advertising campaign comprises effective CPM.

14. The system of claim 11 wherein the cost per action comprises cost per click.

\* \* \* \* \*